(12) United States Patent
Yang

(10) Patent No.: US 7,574,057 B1
(45) Date of Patent: Aug. 11, 2009

(54) EIGEN-BASED METHOD FOR COVARIANCE DATA COMPRESSION

(75) Inventor: Robert E. Yang, Cherry Hill, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 884 days.

(21) Appl. No.: 11/087,467

(22) Filed: Mar. 23, 2005

(51) Int. Cl.
  *G06K 9/36* (2006.01)
  *G06K 9/00* (2006.01)
(52) U.S. Cl. .................. 382/232; 382/103
(58) Field of Classification Search .......... 382/103, 382/232
  See application file for complete search history.

(56) References Cited

U.S. PATENT DOCUMENTS

| | | | | |
|---|---|---|---|---|
| 5,301,241 A | * | 4/1994 | Kirk ..................... | 382/166 |
| 5,615,288 A | * | 3/1997 | Koshi et al. .............. | 382/248 |
| 5,825,326 A | * | 10/1998 | Semler et al. ........... | 342/357.04 |
| 6,480,139 B1 | | 11/2002 | Hoctor .................. | 342/13 |
| 6,498,581 B1 | | 12/2002 | Yu ........................ | 342/90 |
| 6,664,913 B1 | * | 12/2003 | Craven et al. ........... | 341/200 |
| 6,778,514 B1 | | 8/2004 | Boccuzzi et al. ......... | 370/334 |
| 6,829,568 B2 | * | 12/2004 | Julier et al. ............. | 702/189 |
| 6,847,805 B2 | * | 1/2005 | Liu ........................ | 455/69 |

OTHER PUBLICATIONS

"Optimal Data Compression for Multisensor Target Tracking with Communication Constraints," H. Chen, et al, 43rd IEEE Conference on Decision and Control, Atlantis, Paradise Island, Bahamas, Dec. 14-17, 2004.*
"A Coding Algorithm for the Covariance Matrix Representation of Polarimetric Radar Data," G. De Grandi, et al., IEEE Transactions on Geoscience and Remote Sensing, vol. 31, No. 1, Jan. 1993.*
"Ground moving target detection for along-track interferometric SAR data," Sikaneta, I. et al., Aerospace Conference, 2004. Proceedings. 2004 IEEE, vol. 4, Mar. 6-13, 2004 pp. 2227-2235.*

* cited by examiner

*Primary Examiner*—Wenpeng Chen
(74) *Attorney, Agent, or Firm*—Duane Morris LLP

(57) ABSTRACT

An improved covariance matrix encoding scheme wherein a covariance matrix is described in terms of Euler angles and eigenvalues. A covariance matrix, P, is decomposed into its eigenvalues and eigenvectors. The eigenvalues and their corresponding eigenvectors are arranged starting with the smallest value, and the next two ordered such that, the eigenvector set comprises a right-handed coordinate system. Each eigenvalue is then encoded with a logarithmic or other compression scheme. Euler angles are calculated and angle is compressed and an offset is added to each angle. The covariance matrix is then reconstructed from the encoded values to test if the encoded matrix completely covers the original matrix. If necessary, a scale factor is applied to all reconstructed eigenvalues and the scaled versions are then re-encoded as described above. The scaling and re-encoding process ensures that the encoded matrix covers the original matrix.

7 Claims, 3 Drawing Sheets

US 7,574,057 B1

EIGEN-BASED METHOD FOR COVARIANCE DATA COMPRESSION

TECHNICAL FIELD

The present invention relates to the field of data compression techniques. The invention more particularly relates to data compression of covariance matricies wherein a desirable feature of the data compression is the maintenance of a predictable upper bound on matrix volume inflation.

The invention has particular application to the tracking of mobile airborne targets by use of multiple sensors located in disparate positions. Covariance matricies are employed to quantify the uncertainty of the combined sensor data tracking solution and data compression techniques are necessary to speed data transmission between the various sources and users of the tracking data. The invention offers robust encoding of covariance data while minimizing errors that result from the compression process, thus improving the usefulness and accuracy of the tracking data.

BACKGROUND

After the 1991 Persian Gulf War, wherein the tracking and mid-air destruction of SCUD missiles was a high priority, it became clear that faster and more accurate systems with broader range were required for tracking air-born threats. Since then, efforts in this area have focused on the transition from a platform-centered force to a network-centered force. The primary tenet of a network-centered force is the use of mutually-shared information to provide all members of a distributed force with timely and accurate data, thus enabling the most efficient response to threats as opposed to past operations where individual assets were deployed to respond to threats.

One program to develop network-centered technology by the United Stated Department of Defense is the Joint Composite Tracking Network ("JCTN"). The JCTN concept involves composite tracking and cooperative engagement of targets, especially theatre ballistic missiles, such as the SCUD's experienced in the Gulf War. One aim of the JTCN is to expand existing weapons systems' defended areas to enable threat engagements that were not previously possible. Composite tracking is the combined filtering of measurements from separate sensors and/or mathematical fusion of separate sensor tracks to produce, for example, estimates of position and velocity of a target that should be more accurate over a greater range than the estimate from a single sensor.

Because each sensor in a network-centered tracking system has it's own inaccuracies, a critical function of such a system is the proper assessment of the inaccuracy of the tracking solution resulting from the combined sensor data. Covariance matricies are typically used to quantify these inaccuracies.

Efficient use of battlefield communications resources requires that the covariance matricies be compressed before transmission in order to allow maximum data throughput in a minimum amount of time. Various methods may be employed to compress this data, with the goal being to maintain the accuracy of covariance matrix information as fully as possible through the compression and subsequent expansion by the receiving device.

Characteristics of the covariance matrices can help reduce the number of data bits used to represent the matrix. Since covariance matrices are symmetric, the redundant information found in off-diagonal elements can be minimized. Additionally, logarithmic encoding and severe bit truncation can also be used to reduce the data burden. Extreme truncation techniques and rounding, however, can distort the covariance matrices so that the compacted covariance matrix may bound the true covariance in one direction, but under-estimate it in another direction. It is generally considered safer to overestimate the covariance even though this discounts some of the available accuracy of a measurement. Covariance underestimation can lead to invalid tracking results. Typically, an encoding scheme is used and the resulting intermediate covariance matrix is compared to the original covariance. If the intermediate covariance matrix underestimates the original in some direction, the deficiency is calculated and the intermediate matrix is inflated and then re-encoded.

Encoding schemes such as the one proposed in the JCTN assume that range, bearing, and elevation on a track are being reported. A Cartesian covariance encoding oriented with an axis aligned in the range direction is sent with the measurement. In this configuration, the measurement information has small correlation coefficients between range and cross-range axes. These cases tend to behave fairly well with the prior art JCTN matrix encoding.

The JCTN encoding scheme encodes the diagonal elements of an original covariance matrix on a logarithmic scale, while linear encoding is used to encode the correlation coefficients of the off-diagonal elements. The encoded matrix is then expanded and compared to the original matrix. If the expanded matrix does not cover the entire original then the expanded matrix is inflated so that it does. The inflated expanded matrix is then encoded and transmitted.

Not all network-centered defense programs, pass measurement information in range, bearing and elevation coordinates. A problem with reporting in this format is that location data for the sensor source must also be transmitted. This can compromise the security of the sensor platform. An alternative system (JWIN) passes measurement and tracklet information in Earth Centered Earth Fixed (ECEF) coordinates. This allows different coalition members to report tracks without disclosing their locations. Reporting ECEF coordinates rather than own-ship-based range, bearing and elevation means that there may be significant correlations between covariance components. These correlations make encoding the covariance of a measurement more sensitive to rounding errors, and when the covariances are transmitted using the JCTN encoding scheme, there is a tendency to over-inflate the encoded covariance matrix. This results in an overstatement of uncertainty and reduces the value of the tracking data.

The need exists for a covariance encoding and compression scheme that minimizes the number of bits sent and minimizes the inflation due to the encoding while bounding the true covariance.

SUMMARY OF THE INVENTION

In order to solve the problem of covariance inflation resulting from compression and encoding an exemplary encoding scheme is disclosed describing a 3×3 covariance matrix in terms of 3 Euler angles and 3 eigenvalues. The rationale behind the eigenvector-based encoding scheme is that the major cause of covariance inflation is misalignment of the largest eigenvector with respect to the smallest eigenvector. Badly conditioned matrices (i.e. large ratios of (largest eigenvalue)/(smallest eigenvalue) are the most sensitive to inflation. By focusing the method on the alignment issue, the inflation factor is minimized.

Initially, a covariance matrix, P, is decomposed into its eigenvalues and eigenvectors. The eigenvalues and their corresponding eigenvectors are arranged starting with the smallest value, and the next two ordered such that the eigenvector set comprises a right-handed coordinate system. The three angles will correspond to 3 Euler rotations that transform the standard basis set ([1,0,0], [0,1,0], [0,0,1]) into the eigenvector basis.

The rationale for best preserving the accuracy of the best measurement axis can be made from the following heuristic argument. From a percentage basis, the damage caused by a misalignment between the largest and smallest eigenvectors can inflate the smallest eigenvalue very significantly. Ill-conditioned matrices with eigenvalue ratios of 10000:1 and higher are not uncommon to radar sensors.

Each eigenvalue is then encoded with a logarithmic or other compression scheme. Next, Euler angles are calculated that describe the orientation of the eigenvector basis. Each angle is compressed and an offset is added to each angle to ensure that each value is non-negative and each angle is linearly encoded.

The covariance matrix is then reconstructed from the encoded values to test if the encoded matrix completely covers the original matrix. If necessary, a scale factor is applied to all reconstructed eigenvalues and the scaled versions are then re-encoded as described above. The scaling and re-encoding process ensures that the encoded matrix covers the original matrix.

BRIEF DESCRIPTION OF THE DRAWINGS

The invention is best understood from the following detailed description when read with the accompanying drawing figures.

DETAILED DESCRIPTION

In the following detailed description, for purposes of explanation and not limitation, exemplary embodiments disclosing specific details are set forth in order to provide a thorough understanding of the present invention. However, it will be apparent to one having ordinary skill in the art having had the benefit of the present disclosure, that the present invention may be practiced in other embodiments that depart from the specific details disclosed herein. Moreover, descriptions of well-known devices, methods and materials may be omitted so as to not obscure the description of the present invention.

Figure 1:
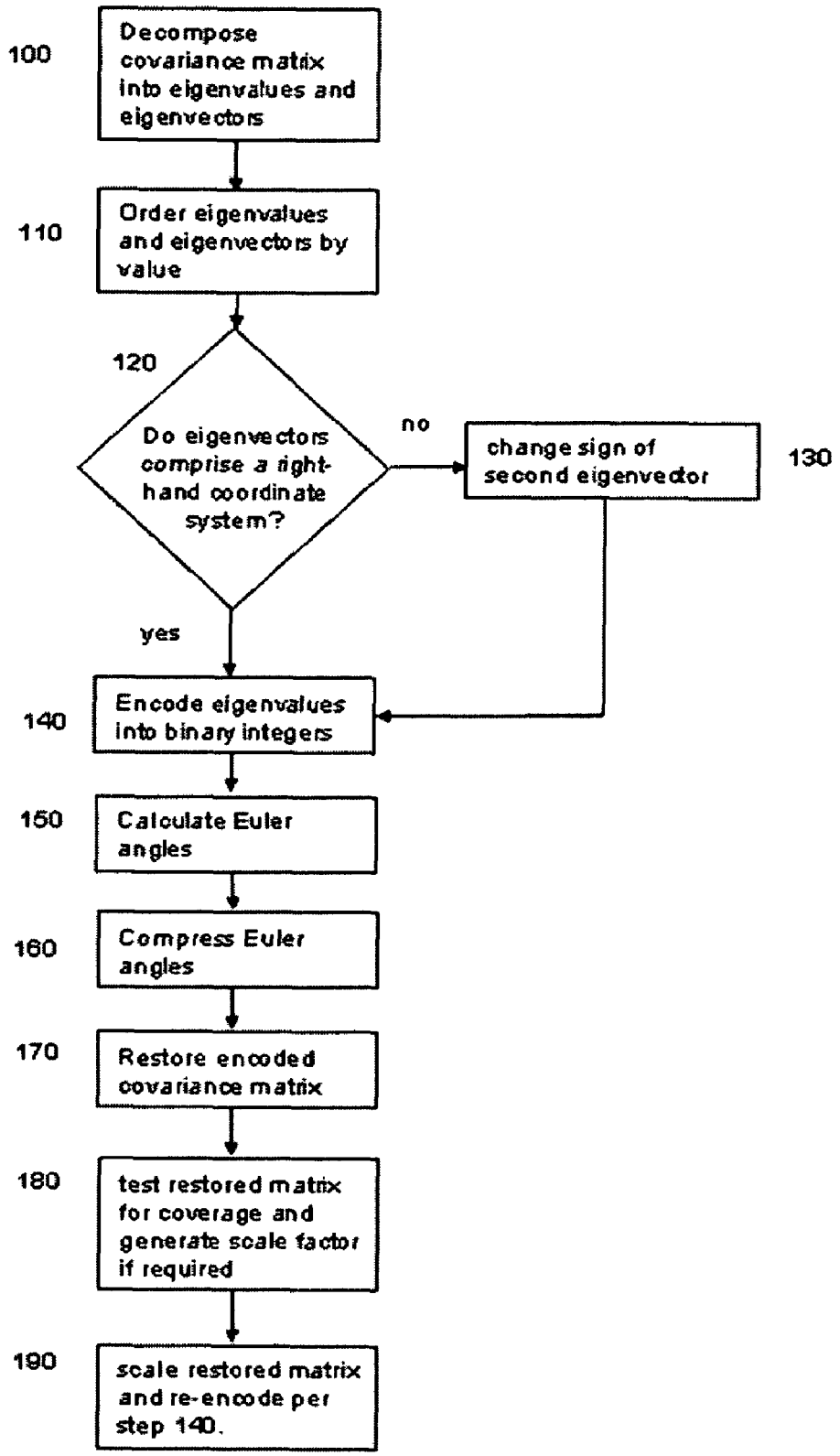
FIG. 1 is a flow diagram of an exemplary version of the inventive method.

In an exemplary embodiment, an $(N*(M+1) \times N*(M+1))$ covariance matrix is decomposed into $N \times N$ sub-blocks, where N is the dimensionality of the model (e.g. 2-D or 3-D) and M is the order of the model (e.g. M=0 is position only, M=1 is position and velocity). The following, which is depicted in the flow diagram of FIG. 1 describes exemplary processing for a 3×3 sub-block (3D position).

At step 100, the 3×3 matrix is decomposed into its three eigenvalues and three eigenvectors. At step 110, the eigenvalues and associated eigenvectors are placed in order starting with the largest eigenvalue. At decision point 120, it is determined whether the order of the three eigenvectors comprises a right-hand coordinate system. In a right hand coordinate system $E3=E1 \times E2$, where E1, E2, E3 are the basis eigenvectors associated with the largest through smallest eigenvalues, respectively. In a left hand system $E3=-(E1 \times E2)$. If the three eigenvectors do not comprise a right-hand coordinate system, then the sign of the second eigenvector is changed at step 130 to convert the eigenvector set to a right-handed system.

At step 140, each eigenvalue $(\lambda_1, \lambda_2, \lambda_3)$ is encoded into a binary value of bit length n, according to the following compression scheme:

$$x_i = \text{ceil}\left(\frac{(2^{Nb}-2)\log(\lambda_i/\text{min}val)}{2\log(\text{max}val/\text{min}val)}\right)$$

where Nb is the number of bits desired to encode each eigenvalue, "max val" and "min val" are the upper and lower allowable ranges for any eigenvalue and ceil is the ceiling function, which rounds the decimal result to the next higher integer.

At step 150, the three Euler angles that represent the orientation of the eigenvector basis are calculated. While several variations of the Euler angles exist and are useful in this method, an exemplary order of rotation that will be carried through this description is for an order of axis rotation: z-, y-, x-. The respective rotations around the z-, y-, and x- axes are $\alpha_z, \alpha_y, \alpha_x$, where $\alpha_z = \arctan 2(e_{1,y}, e_{1,x})$ $\alpha_y = \arctan(e_{1,z})$ $\alpha_x = \arctan(e_{2,z})$ where the notation $e_{j,k}$ $j=\{1, 2, 3\}$, $k=\{x, y, z\}$ designates the x-, y-, or z- component of eigenvector 1, 2 or 3.

After the calculation of the Euler angles, at step 160, each Euler angle is compressed. The domain of $\alpha_z$ is $[-\pi/2:\pi/2]$, $\alpha_y$ is $[-\pi:\pi]$ and $\alpha_x$ $[-\pi:\pi]$. As shown below, an offset is added to each angle to ensure that each value is non-negative and each angle is linearly encoded.

$$y_z = \text{round}\left(\frac{(2^{Nz}-1)(\alpha_z+\pi/2)}{\pi}\right)$$

$$y_y = \text{round}\left(\frac{(2^{Ny}-1)(\alpha_y+\pi)}{2\pi}\right)$$

$$y_x = \text{round}\left(\frac{(2^{Nx}-1)(\alpha_x+\pi)}{2\pi}\right)$$

where $N_x$, $N_y$, and $N_z$ are the number of bits to encode $\alpha_x$, $\alpha_y$, and $\alpha_z$, respectively.

At step 170 the covariance matrix is restored from the encoded Euler angles and encoded Eigenvalues as shown below:

$$\text{cov}_{reconstructed} = R \begin{bmatrix} \lambda_{1,reconstructed} & 0 & 0 \\ 0 & \lambda_{2,reconstructed} & 0 \\ 0 & 0 & \lambda_{3,reconstructed} \end{bmatrix} R^T$$

$$R = \begin{bmatrix} 1 & 0 & 0 \\ 0 & \cos(\alpha_{x,r}) & -\sin(\alpha_{x,r}) \\ 0 & \sin(\alpha_{x,r}) & \cos(\alpha_{x,r}) \end{bmatrix} \begin{bmatrix} \cos(\alpha_{y,r}) & 0 & -\sin(\alpha_{y,r}) \\ 0 & 1 & 0 \\ \sin(\alpha_{y,r}) & 0 & \cos(\alpha_{y,r}) \end{bmatrix} \begin{bmatrix} \cos(\alpha_{z,r}) & -\sin(\alpha_{z,r}) & 0 \\ \sin(\alpha_{z,r}) & \cos(\alpha_{z,r}) & 0 \\ 0 & 0 & 1 \end{bmatrix}$$

$$\lambda_{i,reconstructed} = (\text{min}val)^2 \exp\left(\frac{2x_i \log\left(\frac{\text{max}val}{\text{min}val}\right)}{2^{Nb}-2}\right)$$

$$\alpha_{z,r} = y_z\left(\frac{\pi}{2^{N_z}}\right) - \frac{\pi}{2}$$

$$\alpha_{y,r} = y_z\left(\frac{2\pi}{2^{N_y}}\right) - \pi$$

$$\alpha_{x,r} = y_z\left(\frac{2\pi}{2^{N_x}}\right) - \pi$$

At step 180, the restored covariance matrix is tested to see whether it completely covers the region of the original matrix and the reconstructed eigenvalues scaled and re-encoded for transmission. This is performed by whitening the reconstructed matrix with the inverse of the original matrix as follows:

$$U = \text{cholesky}(\text{inv}(\text{cov}_{original}))$$

$$\text{scale} = \frac{1}{\min(eig(U\text{cov}_{reconstructed}U^T))}$$

At step 190, the scale factor (scale) is then applied to all of the reconstructed eigenvalues $\lambda_{reconstructed}$ and these rescaled eigenvalues are encoded as described above in step 140. The rescaled eigenvalues are then transmitted along with the encoded eigenvectors to the destination equipment.

A side-by-side comparison of encoding schemes (prior art JCTN scheme versus the encoding scheme disclosed herein) was performed using variations of an ill-conditioned covariance matrix. The covariance matrices were produced from a diagonal matrix that was rotated through three Euler rotations.

$$P = R_{roll} R_{el} R_{az} \text{diag}(\lambda_1, \lambda_2, \lambda_3) R_{az}^T R_{el}^T R_{roll}^T$$

The values chosen for $\lambda_1$, $\lambda_2$, $\lambda_3$ were (0.6045, 2627, 35350). These values were selected to maximize quantization problems for the eigenvector approach of encoding. Instead of exhaustively analyzing all possibilities of azimuth, elevation, and roll, the results of a small subset are presented. This subset consists of samples where the azimuth, elevation, and roll angle are in lock step with each other. The angle is varied from 0 to π/2 radians in steps of π/64 radians. The number of bits used in this encoding simulation corresponds to the number of bits currently used by JWIN. These values are:

| Allotment of Data bits | | | | | |
|---|---|---|---|---|---|
| Current-JWIN/JCTN | | | Eigenvalue | | |
| 6 bits (×3) | Square-root of diagonal covariance terms. Range: | Logarithmic encoding | 6 bits (×3) | Square-root of Eigenvalues Range: $10^{-1}$ min $10^7$ max | Logarithmic encoding |

| Allotment of Data bits | | | | | |
|---|---|---|---|---|---|
| Current-JWIN/JCTN | | | Eigenvalue | | |
| 12 bits (×3) | Correlation coefficients Range: −1: +1 | Linear | 12 bits (×3) | $10^{-1}$ min $10^7$ max Euler angles Range: −pi: +pi | Linear |

Figure 2:
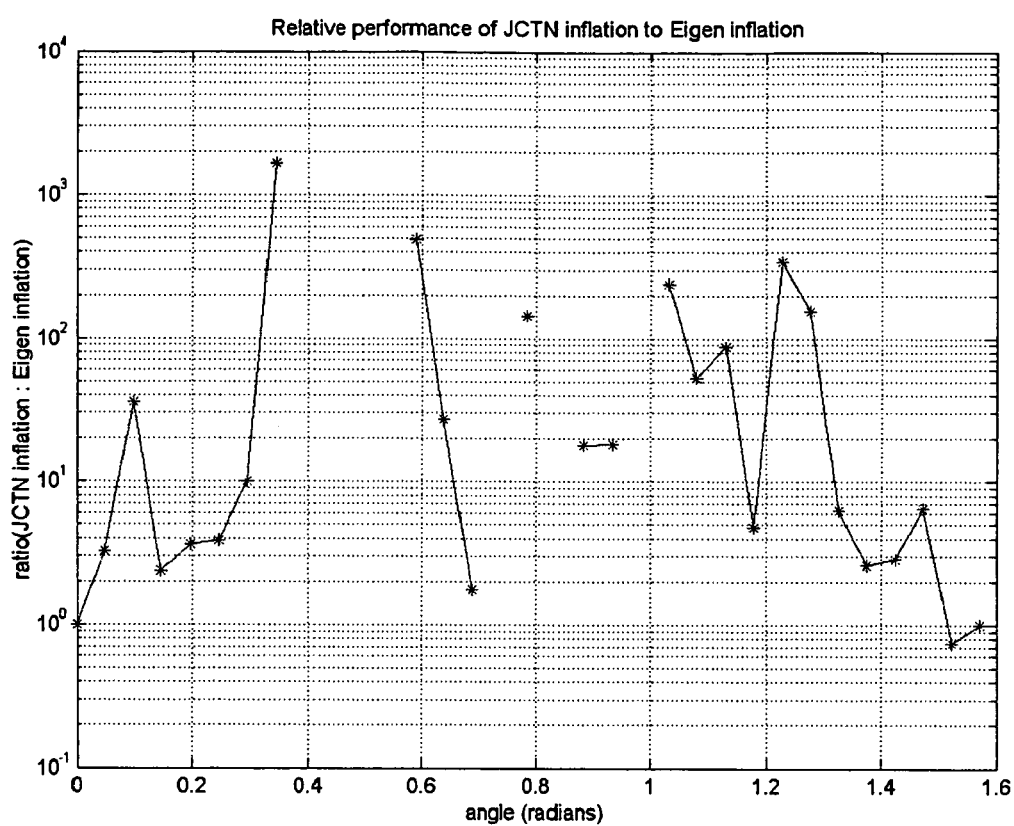
FIG. 2 illustrates a comparison of the relative performance of a prior art encoding scheme to that of the invention.

A comparison summary is given in FIG. 2. Note that comparisons are omitted at the points where the JCTN encoding fails to yield a positive-definite matrix. These data points represent a serious flaw in the JCTN encoding scheme. Individual covariance plots from this simulation are given in the appendix. As can be seen in FIG. 2, the eigenvalue based covariance encoding scheme does not always produce the tightest encoding (see second data point from the far right). In general, however, the eigenvalue encoding scheme is far superior. In the vast majority of cases, it produces less inflation. The inflation that it produces is can be predictably bounded and that bound is far smaller than the bound found in the JCTN case.

Figure 3:
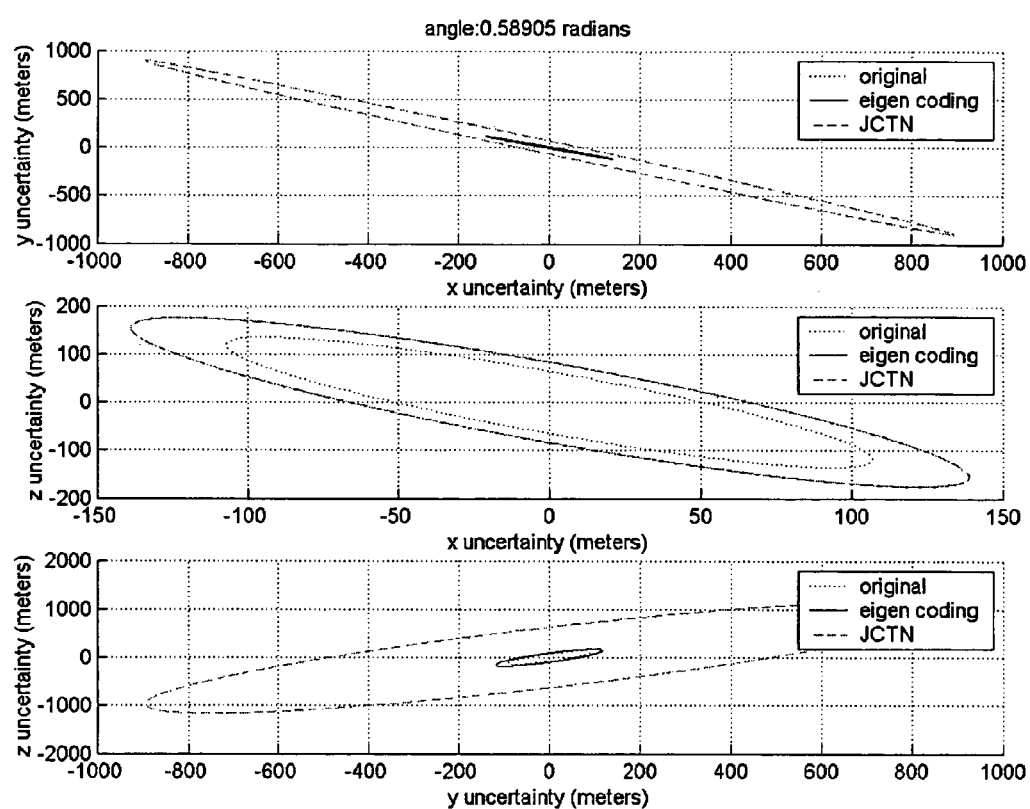
FIG. 3 further illustrates a comparison of the performance of a prior art encoding scheme to that of the invention for a particular data set.

The performance of the disclosed method versus the over-inflation resulting from the prior art JCTN scheme is seen in FIG. 3, which plots the covariance in three planes where the test matrix has been rotated 0.58905 radians. In the XY plane (top chart) both the Eigen-based encoding and the original covariance are equal (the dark plot at the center). The JCTN encoded covariance (dashed plot) is greatly inflated to cover the original matrix. While in the XZ plane, the JCTN and eigen-based covariances are equal and not much greater than the original covariance, in the YZ plane the JCTN covariance is greatly inflated whereas the eigen coded covariance is equal to the original.

In accordance with another aspect, the subject invention comprises a program storage medium that constrains operation of the associated processors. Exemplary computer readable storage devices include conventional computer system RAM (random access memory), ROM (read only memory), EPROM (erasable, programmable ROM), EEPROM (electrically erasable, programmable ROM), flash memory, and magnetic or optical disks or tapes. Exemplary computer readable signals, whether modulated using a carrier or not, are signals that a processor hosting or running the program may be configured to access, including signals downloaded through the Internet or other networks. Examples of the foregoing include distribution of the program(s) on a CD ROM or via Internet download.

In the form of processes and apparatus implemented by digital processors, the associated programming medium and computer program code is loaded into and executed by a processor, or may be referenced by a processor that is otherwise programmed, so as to constrain operations of the processor and/or other peripheral elements that cooperate with the processor. Due to such programming, the processor or computer becomes an apparatus that practices the method of the invention as well as an embodiment thereof. When implemented on a general-purpose processor, the computer program code segments configure the processor to create specific logic circuits. Such variations in the nature of the program carrying medium, and in the different configurations by which computational and control and switching elements can be coupled operationally, are all within the scope of the present invention.

The foregoing discussion of the invention has been presented for purposes of illustration and description. Further, the description is not intended to limit the invention to the form disclosed herein. Consequently, variations and modifications commensurate with the above teachings and with the skill and knowledge of the relevant art are within the scope of the present invention. The embodiment described herein above is further intended to explain the best mode presently known of practicing the invention and to enable others skilled in the art to utilize the invention as such, or in other embodiments, and with the various modifications required by their particular application or uses of the invention. It is intended that the appended claims be construed to include alternative embodiments to the extent permitted by the prior art.

What is claimed is:

1. A method for compression of an N×N covariance matrix, wherein N is a positive integer less than four, comprising:
   decomposing said N×N covariance matrix into N eigenvalues and N eigenvectors in a first computer process;
   compressing each eigenvalue in a second computer process;
   calculating N Euler angles that represent the orientation of the N eigenvectors in a third computer process;
   compressing each Euler angle in a fourth computer process;
   offsetting each Euler angle in a fifth computer process to ensure that each angle is positive and each angle is linearly encoded;
   calculating a restored N×N covariance matrix from said N compressed Euler angles and N compressed eigenvectors in a sixth computer process;
   calculating N restored eigenvalues from said restored N×N covariance matrix in a seventh computer process; and
   scaling said restored N eigenvalues in an eighth computer process.

2. The method of claim 1 wherein said compressing of each eigenvalue is a logarithmic compression.

3. The method of claim 2 wherein said logarithmic compression is a compression into a binary number wherein each encoded eigenvalue ($x_i$) is formed as follows:

$$x_i = \text{ceil}\left(\frac{(2^{Nb} - 2)\log(\lambda_i / \text{minval})}{2\log(\text{maxval} / \text{minval})}\right)$$

where $N_b$ is the number of bits into which each eigenvalue ($\lambda_i$) is to be encoded, "max val" and "min val" are upper and lower allowable ranges for said eigenvalues and ceil is a ceiling function which rounds a decimal result to the next highest integer.

4. The method of claim 1 wherein said N×N covariance matrix is a 3×3 covariance matrix and wherein said calculation of said Euler angles is carried out using an order of axis rotation of z-, y-, x- and rotations around the z-, y- and x- axes are $\alpha_z$, $\alpha_y$, $\alpha_x$, where $\alpha_z = \arctan 2(e_{1,y}, e_{1,x})$ $\alpha_y = \arctan(e_{1,z})$ $\alpha_x = \arctan(e_{2,z})$ and wherein for the notation $e_{j,k}$ j={1, 2, 3}, k={x, y, z} designates the x-, y-, or z- component of eigenvector 1, 2 or 3.

5. The method of claim 1 wherein said compression of said Euler angles is accomplished as follows:

$$y_z = \text{round}\left(\frac{(2^{Nz} - 1)(\alpha_z + \pi/2)}{\pi}\right)$$

$$y_y = \text{round}\left(\frac{(2^{Ny} - 1)(\alpha_y + \pi)}{2\pi}\right)$$

$$y_x = \text{round}\left(\frac{(2^{Nx} - 1)(\alpha_x + \pi)}{2\pi}\right)$$

where $N_x$, $N_y$, and $N_z$ are the number of bits to encode Euler angles $\alpha_x$, $\alpha_y$, and $\alpha_z$ respectively.

6. The method of claim 1 wherein said scaling is performed by:
   comparing said restored N×N covariance matrix with said N×N covariance and calculating a scale factor as follows;

$U = \text{cholesky}(\text{inv}(\text{cov}_{original}))$ $$\text{scale} = \frac{1}{\min(eig(U\text{cov}_{reconstructed}U^T))}$$

where $\text{cov}_{original}$ is said N×N covariance matrix, $\text{cov}_{reconstructed}$ is said restored N×N covariance matrix, cholesky indicates computation of a Cholesky factor, "eig" indicates calculation of an eigenvalue and "min" indicates determining the minimum eigenvalue calculated.

7. A computer readable medium comprising:
   code for decomposing an N×N covariance matrix, wherein N is a positive integer less than four, into N eigenvalues and N eigenvectors;
   code for compressing each eigenvalue;
   code for calculating N Euler angles that represent the orientation of the N eigenvectors;
   code for compressing each Euler angle;
   code for offsetting each Euler angle to ensure that each angle is positive and each angle is linearly encoded;
   code for calculating a restored N×N covariance matrix from said N compressed Euler angles and N compressed eigenvectors;
   code for calculating N restored eigenvalues from said restored N×N covariance matrix; and
   code for scaling said restored N eigenvalues.

* * * * *

UNITED STATES PATENT AND TRADEMARK OFFICE
CERTIFICATE OF CORRECTION

PATENT NO. : 7,574,057 B1  Page 1 of 1
APPLICATION NO. : 11/087467
DATED : August 11, 2009
INVENTOR(S) : Robert E. Yang It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1148 days.

Signed and Sealed this

Seventh Day of September, 2010

David J. Kappos
*Director of the United States Patent and Trademark Office*